UNITED STATES PATENT OFFICE.

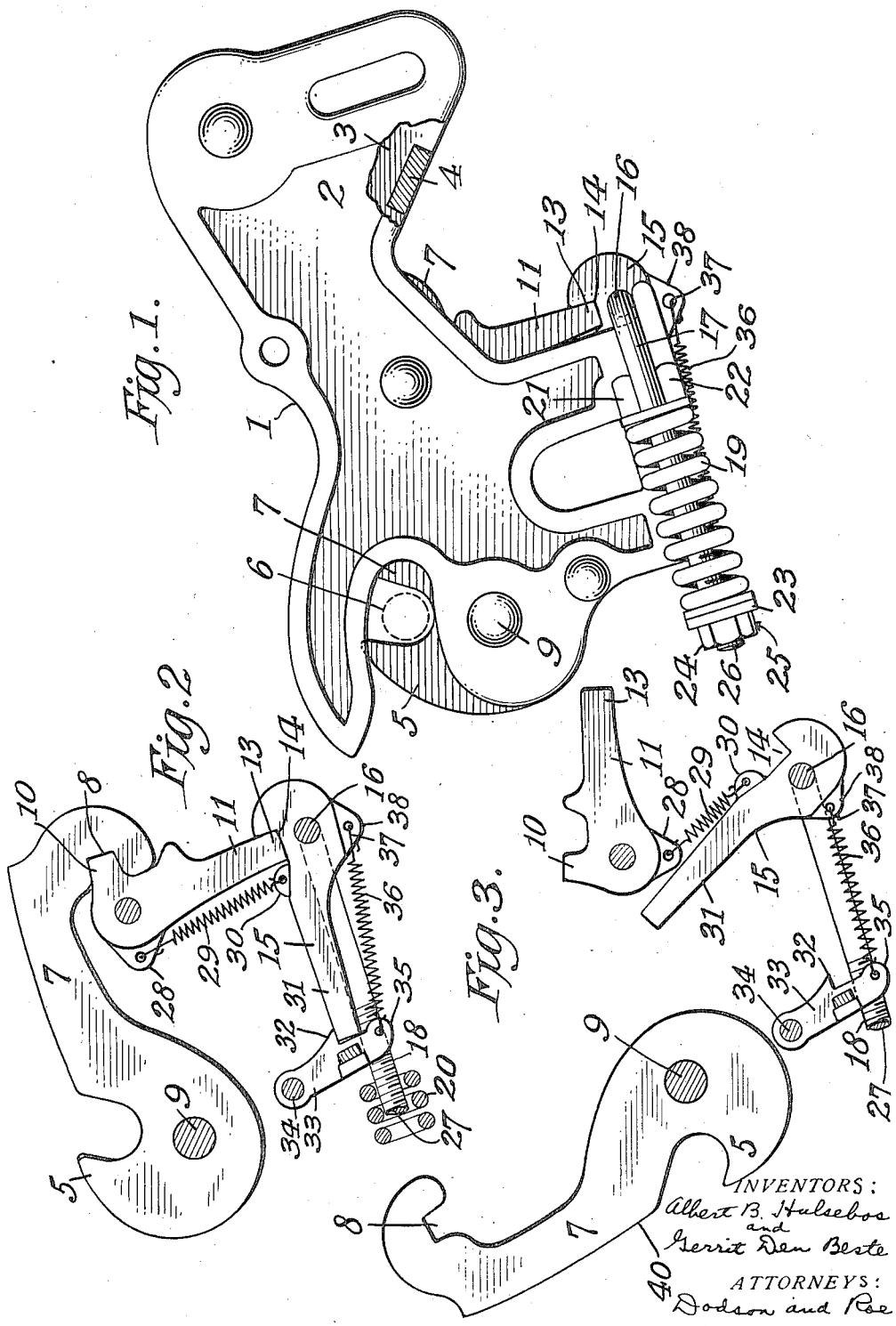

ALBERT B. HULSEBOS AND GERRIT DEN BESTEN, OF HOLLAND, MICHIGAN, ASSIGNORS TO SAFETY RELEASE CLEVIS CO., OF HOLLAND, MICHIGAN, A CORPORATION OF MICHIGAN.

HEAVY-DUTY SAFETY HITCH FOR LARGE TRACTORS AND ROAD GRADERS.

1,402,862. Specification of Letters Patent. Patented Jan. 10, 1922.

Application filed July 13, 1921. Serial No. 484,516.

*To all whom it may concern:*

Be it known that we, ALBERT B. HULSEBOS and GERRIT DEN BESTEN, citizens of the United States, residing at Holland, county of Ottawa, and State of Michigan, have invented a certain new and useful Improvement in Heavy-Duty Safety Hitches for Large Tractors and Road Graders, of which the following is a specification.

Our invention relates to that class of devices which are designed to release whatever is being pulled by the tractor when it strikes an obstacle which will cause injury to the implement and is strictly a heavy duty hitch designed principally for the protection of heavy road machinery.

Our invention has for its object to provide means whereby the releasing of the hitch will not result in any injury to anyone by reason of the fact that the arm of the hook which engages the clevis on the tractor will be so short that it will not affect anyone near. One of the objections to devices of this kind is that there is usually a long arm which has to swing through the clevis and if it strikes someone, it will do considerable injury owing to the heavy spring pressure to which it is subjected.

Our invention has for its further object to provide a combination of compound levers so arranged that the holding tension of the spring can be greatly multiplied so that a moderate spring will hold the heaviest road machinery.

Our invention has for its further object to provide means whereby the hitch can be automatically coupled without the interposition of any manual means thereby greatly lessening the possibility of accidents in re-coupling after the release has been effected.

Our means of accomplishing the foregoing objects may be more readily understood by having reference to the accompanying drawings which are hereunto annexed and are a part of this specification, in which—

Fig. 1 is a plan view of our hitch when assembled.

Fig. 2 is a similar view with the body portion removed showing the interior construction.

Fig. 3 is a similar view with the parts released.

Similar reference numerals refer to similar parts throughout the entire description.

As shown in the drawings, the device comprises a main or body portion 1 which is cast or formed with two plate members 2 and 3 which are connected together by suitable cast webs 4 which are located at convenient spaced intervals so as not to interfere with the operation of the mechanism. Intermediate the two plates 2 and 3, is mounted a swinging lever which has a hook 5 formed on one end which may engage the clevis 6 of the tractor (not shown). The shank 7 of the hook is extended and is provided with a notch 8 adjacent its end. The hook swings about a pivot or fulcrum 9. The notch 8 is engaged by a detent 10 formed on a lever 11 which swings about a pivot 12 which forms a fulcrum for the said lever 11. This lever is provided with a laterally extending portion 13 which is adapted to enter a notch 14 formed in another lever 15 which is carried by and swings upon the top of a U-shaped member 16.

The arms 17 and 18 of the member 16 have mounted thereon coil springs 19 and 20. The arms of the U-shaped member are held in position by means of lugs or guides 21 and 22 which are cast or formed upon the main body casting 1 and against which the coil springs abut. These guides 21 and 22 permit the arms to slide longitudinally therein.

A yoke 23 is fitted over the ends of the two arms 17 and 18 and is held in position by means of nuts 24 and 25 which are threaded upon the ends 26 and 27 of the U-shaped member 16.

It will be apparent from the foregoing description that by tightening these nuts, the yoke 23 will be moved upon the arms 17 and 18 and that the springs 19 and 20 will be compressed against the lugs 21 and 22 cast on the main frame or body portion 1, so that any desired tension of the spring can be obtained, and that it can be regulated as desired.

A lug 28 is formed upon the lever 11 adjacent to the fulcrum 12 and to it is secured one end of a coil spring 29, the other end of which is secured to a lug 30 formed on the lever 15, the purpose of which will be hereinafter explained. The lever 15 is provided with an outwardly extending portion 31 which is adapted to swing between the arms 17 and 18 of the U-shaped member 16. The lower end of the portion 31 is engaged by a detent 32 formed upon an arm 33 which swings upon a pin 34 mounted in the main body portion 1. The other end 35 of this arm 34 is secured to one end of a coil spring 36; the other end 37 of which is attached to a lug 38 formed on the lever 15 at a point on the opposite side of its pivot. This spring serves to hold the notch 32 in engagement with the end 31 of the lever 15.

The operation of the device is as follows: Assuming the position when the parts are as shown in Fig. 1 for the tractor to draw the implement or plow. As soon as the plow strikes an obstruction which is sufficient to do damage thereto, an added strain will be put upon the hook 5. This causes it to swing upon the pivot or fulcrum 9, bringing a pressure upon the detent 10 which is in the notch 8. This pressure tends to compress the spring through the medium of the lever 11, and as they are compressed it follows that the U-shaped member will move upwardly sliding in the guides 21 and 22 until the end 31 is out of engagement with the detent 32. The lever 15 swings upon the U-shaped member as soon as the end 31 is released from the notch 32, this movement being facilitated by the tension of the spring 29. This swinging of the lever 15 upon its release from the notch 32, operates to release the end 13 of the lever 11 from the notch 14 and these parts will assume the position shown in Fig. 3 which will operate so that the detent 10 will be completely released from the notch 8 in the end of the shank 7 of the hook 5 and the hook 5 will swing to the open position shown in the said figure and the clevis 6 will be released.

The time when this operation will take place is governed and controlled entirely by the tension of the spring 19 and 20 and as heretofore pointed out, this tension may be regulated by means of the nuts 24 and 25 to any desired amount. When the parts are in the position as shown in the said Fig. 3 the tractor may be backed up against the plow, the clevis striking against that part of the hook indicated by reference numeral 40. This operates to swing it upon the pin 9 swinging the end 7 around until the notch 8 commences to engage the detent 10. This serves to swing the lever 11 upon its fulcrum 12 bringing it down so that the end 13 thereof is brought into engagement with the notch 14 of the lever 15. This swings it upon the U-shaped member 16 until the end 31 is engaged by the notch 32 on the swinging arm 33 when the device is recoupled and ready to proceed with the operation.

It will be apparent to persons skilled in the art that by this construction we have accomplished the desirable result set out in the preamble of our specification, because of the fact that the hook 5 is extremely short so that it can release the clevis of the tractor very quickly and there is no long projection to swing through the said clevis. Moreover, by using the compound leverage as shown in the drawings herein, for example, the lifting of the lever 11, it is apparent that the tension of the springs is multiplied very greatly and consequently it will require a very much greater application of power to the hook 5 in order to compress these springs. This is further desirable because of the fact that it is much easier to recouple the device and also because of the initial expense in the saving of the cost of the large spring.

When the hitch has released itself and the parts are in the position shown in Fig. 3, if the tractor backs up against the plow as described, the clevis will strike against the arm 40 of the hook 5 as hereinbefore described and swing the parts into the locked position shown in Fig. 2. This movement is greatly facilitated by the fact that the swinging arm 33 is in the position shown in Fig. 3, so that it permits the end 31 of the lever 15 to swing past the notch. The swinging arm will then, through the medium of the coil spring 18, instantly be brought into engagement with the end 31 so that the notch 32 will hold the lever 15 in the correct position. It will thus be seen from this arrangement of the parts that we are enabled to produce an automatic recoupling and releasing hitch for extremely heavy duty without having the weight so excessive as to make it cumbersome and difficult to handle.

While we have described a specific form of construction, we do not desire to be limited to the specific form illustrated for the reason that changes in the shape of the various parts may be made without deviating from the spirit of our invention which is designed to produce the result through a series of compound leverage so that the leverage is against the pull, thereby multiplying the effectiveness of the spring, and we do not desire to be limited save and except as such limitations may appear in the hereinafter appended claims.

Having described our invention what we regard as new and desire to secure by Letters Patent is:

1. In a device of the character described, a body portion, a swinging hook, a pivot on which said hook swings adjacent the hook portion, a pivoted lever which engages the end of the said hook away from its pivot but adjacent the pivoted lever, a laterally extended portion on said lever, a U-shaped member, a lever carried thereby which swings intermediate the arms of said U, there being a notch on said lever adjacent the U which is engaged by the extended portion of the first-named lever, a swinging arm attached to the body portion which prevents said last-named lever from swinging, a spring to hold said arm normally in engagement with the end of said lever, a coil spring on each arm of the U-shaped member, lugs on the body portion against which the ends of said springs abut, a yoke on said U-shaped member which abuts the other end of the spring, means to adjust the tension of the spring.

2. In a device of the character described, a body portion comprising two plates in spaced relation, a hook intermediate said plates, a pivot on which said hook swings, the shank of said hook being extended and having a notch therein, a lever, a fulcrum therefor, a detent on said lever adjacent the fulcrum which engages said notch, a U-shaped member, lugs which form guides for the arms of the U formed on said body portion, a lever carried by the U-shaped member which swings intermediate the arms of the U, there being a notch in said lever adjacent said U, an extended arm on said first-named lever which engages said notch, a swinging arm pivoted on said body, a detent thereon, an extended portion on said second lever which engages said detent, a coil spring on each arm of the U which abuts the guides, and means to adjust the tension of said spring.

3. In a device of the character described, a body portion comprising two plates in spaced relation, a hook intermediate said plates, a pivot on which said hook swings, a shank on said hook being extended and having a notch therein, a lever, a fulcrum therefor, a detent on said lever adjacent the fulcrum which engages said notch, a U-shaped member, lugs which form guides for the arms of the U formed on said body portion, a lever carried by the U-shaped member which swings intermediate the arms of the U, there being a notch in said lever adjacent said U, an extended end on said first-named lever which engages said notch, a swinging arm pivoted on said body, a detent thereon, an extended portion on said lever which engages said detent, means to hold said detent in engagement with said extended portion, a coil spring on each arm of the U which abuts the guides, and means to adjust the tension of said spring.

4. In a device of the character described, a body portion comprising two plates in spaced relation, a hook intermediate said plates, a pivot on which said hook swings, the shank of said hook being extended and having a notch therein, a lever, a fulcrum therefor, a detent on said lever adjacent the fulcrum which engages said notch, a U-shaped member, lugs which form guides for the arms of the U formed on said body portion, a lever carried by the U-shaped member which swings intermediate the arms of the U, there being a notch in said lever adjacent said U, an extended arm on said first-named lever which engages said notch, a coil spring which connects said levers and which extends from lugs adjacent their respective pivots, a swinging arm pivoted on said body, a detent thereon, an extended portion on said second lever which engages said detent, a coil spring on each arm of the U which abuts the guides, and means to adjust the tension of said spring.

5. In a device of the character described, a body portion, a swinging hook, a pivot on which said hook swings adjacent the hook portion, a pivoted lever which engages the end of the said hook away from its pivot but adjacent the pivoted lever, a laterally extended portion on said lever, a U-shaped member, a lever carried thereby which swings intermediate the arms of said U, there being a notch on said lever adjacent the U which is engaged by the extended portion of the first-named lever, a swing arm which prevents said last-named lever from swinging, a spring to hold said arm normally in engagement with the end of said lever, a coil spring on each arm of the U-shaped member, lugs on the body portion against which the end of said spring abuts, a yoke on said U-shaped member which abuts the other end of the spring, means to adjust the tension of the spring, said springs operating to hold the parts normally in engagement with each other.

6. In a device of the character described, a body portion comprising two plates in spaced relation, a hook intermediate said plates, a pivot on which said hook swings, the shank of said hook being extended and having a notch therein, a lever, a fulcrum therefor, a detent on said lever adjacent the fulcrum which engages said notch, a U-shaped member, lugs which form guides for the arms of the U formed on said body portion, a lever carried by the U-shaped member which swings intermediate the arms of the U, there being a notch in said lever adjacent said U, an extended arm on said first-named lever which engages said notch, a detent which prevents the swinging of said lever until said U has moved longitudinally a predetermined distance, a coil spring on each arm of the U which abuts the guides, and means to adjust the tension of said spring.

7. In a device of the character described, a body portion, a swinging hook, a pivot on which said hook swings adjacent the hook portion, a pivoted lever which engages the end of the said hook away from its pivot but adjacent the pivot of said lever, a laterally extended portion on said lever, a U-shaped member, a lever carried thereby which swings intermediate the arms of said U, there being a notch on said lever adjacent the U which is engaged by the extended portion of the first-named lever, means to prevent the movement of the last lever on its fulcrum until it has moved longitudinally a predetermined distance, a coil spring on each arm of the U-shaped member, lugs on the body portion against which the end of said spring abuts, a yoke on said U-shaped member which abuts the other end of the spring, and means to adjust the tension of the spring.

8. In a device of the character described, the combination with a body portion, of a pivot, a hook which swings thereon, a plurality of levers, the first of which engages said hook at a point remote from its pivot, which levers engage each other at points alternately remote from and adjacent to their fulcrum, a plurality of springs which maintain said parts normally in position but which permit their release when the pull on the hook exceeds a predetermined amount.

9. In a device of the character described, a body portion, a hook mounted thereon, a series of levers which hold said hook normally closed by engagement with each other at points alternately remote from and adjacent to their fulcrums, and means which maintain said parts normally in position but which permit their release when the pull on the hook exceeds a predetermined amount.

In testimony whereof, we have signed the foregoing specification.

ALBERT B. HULSEBOS.
GERRIT DEN BESTEN.